United States Patent [19]
Schaefer et al.

[11] Patent Number: 5,639,212
[45] Date of Patent: Jun. 17, 1997

[54] CAVITY SEALED COMPRESSOR

[75] Inventors: Robert Allen Schaefer, North Reading; Robert Patrick Tameo, South Peabody; Richard William Laferriere, Topsfield, all of Mass.

[73] Assignee: General Electric Company, Cincinnati, Ohio

[21] Appl. No.: 626,212

[22] Filed: Mar. 29, 1996

[51] Int. Cl.$^6$ .................................................. F01D 11/00
[52] U.S. Cl. .................................. 415/173.7; 415/173.1
[58] Field of Search ........................... 415/170.1, 173.7, 415/173.1, 174.3, 174.5; 277/53

[56] References Cited

U.S. PATENT DOCUMENTS

| | | | |
|---|---|---|---|
| 3,849,023 | 11/1974 | Klompas | 415/174.5 |
| 4,526,508 | 7/1985 | Antonellis et al. | 415/173.7 |
| 5,236,302 | 8/1993 | Weisgerber et al. | 415/173.7 |
| 5,352,087 | 10/1994 | Antonellis | 415/173.7 |
| 5,429,478 | 7/1995 | Krizan et al. | 415/174.5 |

*Primary Examiner*—Edward K. Look
*Assistant Examiner*—Mark Sgantzos
*Attorney, Agent, or Firm*—Andrew C. Hess; Wayne O. Traynham

[57] ABSTRACT

A compressor includes an axially split casing surrounding stages of rotor blades and stator vanes. The vanes include a shroud joined to radially inner ends thereof and disposed in a cavity adjoining a rotor disk. An annular cavity seal abuts the vane shroud and adjoins the rotor disk for sealing the cavity therebetween. The seal is axially retained to the shroud in both casing halves, and is radially inwardly retained in only the casing lower half for allowing assembly and removal of the casing upper half relative to the casing lower half without radial interference between the shroud and the seal.

10 Claims, 7 Drawing Sheets

5,639,212

CAVITY SEALED COMPRESSOR

The U.S. Government has rights in this invention in accordance with Contract No. N00019-91-C-0114 awarded by the Department of Navy.

BACKGROUND OF THE INVENTION

The present invention relates generally to gas turbine engines, and, more specifically, to compressors therein.

A typical axial flow compressor in a gas turbine engine includes several rows of compressor rotor blades extending radially outwardly from corresponding rotor disks, with corresponding rows of stator vanes being disposed therewith. Adjacent rows of vanes and blades define a compressor stage, with each stage further compressing air in-turn in the axial downstream direction. The finally compressed air is then mixed with fuel in a combustor and ignited for generating hot combustion gases which flow through conventional turbines which extract energy therefrom for powering the compressor in operation, as well as providing useful work in propelling an aircraft, for example.

The stator vanes may either be variable in angular orientation or fixed, and extend radially inwardly from the stator casing. The casing is typically split along an axial, centerline splitline or split plane into upper and lower casing halves, with each casing half having axial flanges at the splitline for bolting together the two casing halves to form the fully annular casing. The casing may also be split in the radial direction into adjoining front and rear portions if desired for long, multi-stage axial compressors. Corresponding radial flanges are used for bolting together the front and rear portions.

During assembly, the stator vanes are firstly mounted into their respective casing halves. Conventional vane shrouds are then mounted to the radially inner ends of the vanes for many of the vane stages as desired in a particular design. The various rotor stages are separately assembled together using interconnecting annular spacers therebetween to collectively form a rotor or spool with several stages of rotor blades extending radially outwardly therefrom and spaced axially apart for receiving the corresponding rows of stator vanes. The rotor is then assembled into position in the preassembled casing lower half with the rotor blades being disposed between corresponding stages of the stator vanes. The preassembled casing upper half, including the remaining stages of stator vanes joined thereto, is then assembled over the casing lower half and pre-installed rotor, with the axial flanges being bolted together to complete the assembly of these components.

The assembly process requires sufficient axial clearance between the various vane shrouds and the forward and aft adjacent blade rows for allowing assembly without interference or obstruction. Since the vanes and shrouds are stationary components, and the rotor blades and disks rotate, the axial clearances between these components must be sufficient to prevent undesirable contact therebetween during operation of the engine, and during attendant thermal expansion and contraction of the components.

The annular regions defined between adjoining blade stages around corresponding spacer therebetween defines an annular cavity in which the vane shroud is contained. The cavity size is relatively large due to the axial clearance requirements and assembly considerations typically found in axial compressors. Extending radially outwardly from the interstage spacers are annular labyrinth seal teeth which cooperate with conventional annular seal members supported by the vane shroud for sealing airflow around the vane shrouds during operation. The labyrinth seals reduce backflow of the compressed air around the vane shrouds in the cavities due to the pressure gradient of the compressed air which has a higher pressure in each succeeding stage than that of the previous stage.

Although the labyrinth seals are affective for reducing this backflow leakage, relatively large cavities nevertheless are undesirable since they add to undesirable rotor windage pressure losses and secondary flows, and adversely affect compressor stall margin. Leakage of compressor air into the cavities during operation subjects the air to frictional acceleration by the rotor and secondary flows in the cavity therefrom.

Reducing the cavity size by reducing the axial clearances between the vanes and blades is undesirable and is limited by required minimum axial clearances for allowing both assembly of the components as well as thermal expansion and contraction of the components during operation. Increasing size of the vane shrouds to occupy more space in the cavities is undesirable due to the increased weight thereof, complexity, and cost, for example. In an aircraft gas turbine engine, weight is a major design factor, which should be maintained as low as possible for maximizing efficiency of operation.

SUMMARY OF THE INVENTION

A compressor includes an axially split casing surrounding stages of rotor blades and stator vanes. The vanes include a shroud joined to radially inner ends thereof and disposed in a cavity adjoining a rotor disk. An annular cavity seal abuts the vane shroud and adjoins the rotor disk for sealing the cavity therebetween. The seal is axially retained to the shroud in both casing halves, and is radially inwardly retained in only the casing lower half for allowing assembly and removal of the casing upper half relative to the casing lower half without radial interference between the shroud and the seal.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 8 is a side view of the adjoining first and second segments illustrated in FIG. 7 taken along line 8—8.

DESCRIPTION OF THE PREFERRED EMBODIMENT(S)

Figure 1:
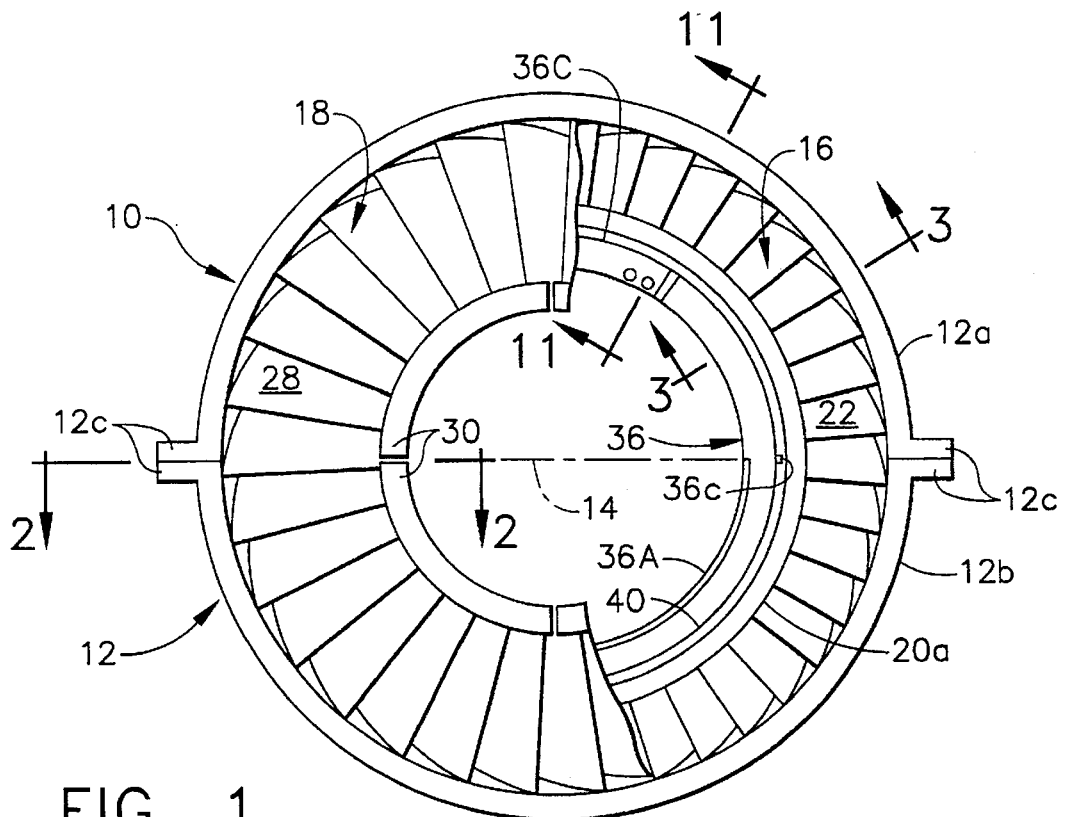
FIG. 1 is a schematic, elevational front view of an axially split gas turbine engine axial compressor having stages of vanes and blades and a cavity seal therebetween in accordance with one embodiment of the present invention.

Illustrated schematically in FIG. 1 is a front view of a multi-stage aircraft gas turbine engine axial compressor 10 in accordance with an exemplary embodiment of the present invention. The compressor includes an axially split annular casing 12 including 180° arcuate lower and upper halves 12a and 12b fixedly joined together by conventional bolts at respective axial or horizontal flanges 12c in a conventional arrangement. The casing halves 12a,b collectively form the annular casing 12 in two pieces having an axial splitline or split plane 14. If desired, the casing 12 may also be split in the radial direction to form front and rear portions (not shown).

Figure 2:
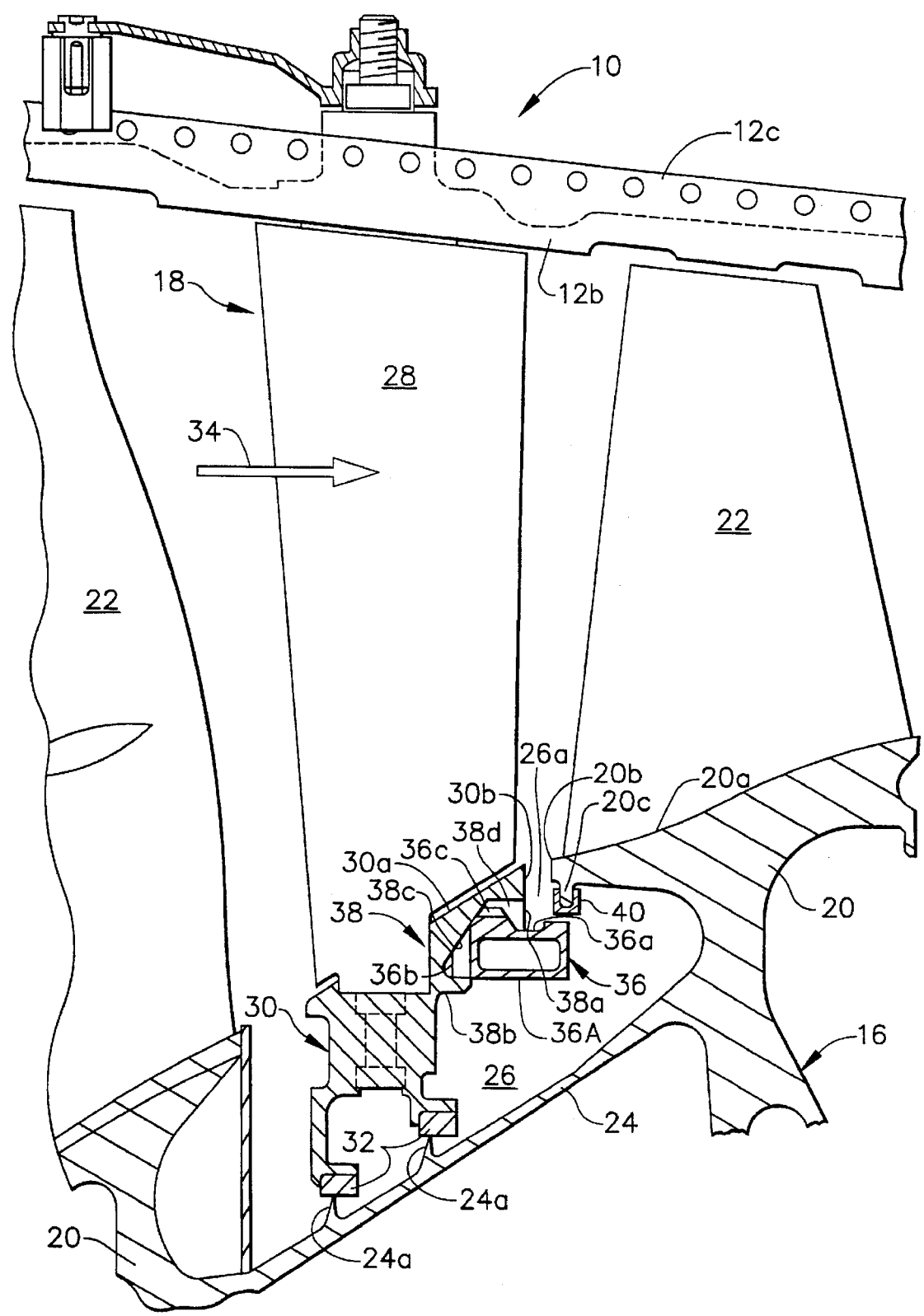
FIG. 2 is a top, partly sectional view of a portion of the casing lower half illustrated in FIG. 1 and taken along line 2—2 illustrating adjacent rotor blade stages and shrouded vanes therebetween, with the cavity seal therein.

Referring to both FIGS. 1 and 2, the compressor 10 further includes a conventional multi-stage rotor 16 and a corresponding multi-stage stator 18 disposed coaxially with the rotor 16 along an axial centerline axis of the engine. As shown in FIG. 2, the rotor includes a plurality of rotor disks 20 each having a plurality or row of circumferentially spaced apart compressor rotor blades 22 extending radially outwardly therefrom inside the casing 12, with radially outer tips thereof adjoining the inner surface of the casing 12. An annular spacer 24 extends axially between adjacent disks 20 and is fixedly or integrally joined therewith, and is spaced radially inwardly from the blades 22 to define a corresponding interstage cavity 26.

The stator 18 is coaxial with the rotor 16 and includes corresponding rows of circumferentially spaced apart stator vanes 28 extending radially inwardly from the casing 12 and adjacent to respective rows of the blades 22. The vanes 28 are conventionally mounted to the casing 12 for either variable or fixed angular orientation.

In accordance with the present invention, the stator vanes 28 include a circumferentially extending vane shroud 30 fixedly joined to radially inner ends of the vanes 28 and disposed in the cavity 26. But for the present invention as described in further detail hereinbelow, the vane shroud may take any conventional form including one or more commonly configured segments per casing half, and preferably also includes one or more conventional annular seal pads 32 which cooperate with annular labyrinth seal teeth 24a extending radially outwardly from the spacer 24. The teeth 24a and pads 32 define labyrinth seals for reducing backflow or leakage around the shroud 30 in the cavity 26.

During operation of the compressor 10, air 34 is increasingly compressed from stage to stage in the axial downstream direction as it sequentially passes over the vanes 28 and blades 22 of each compressor stage so that the pressure thereof increases from stage to stage. Since the pressure of the air 34 downstream of each vane 28 is greater than the pressure of the air upstream of the same vane 28, the labyrinth seals defined at the teeth 24 and pads 32 reduce undesirable leakage thereat.

However, as indicated above in the Background section, the various cavities 26 provided between adjacent rotor blade stages for receiving the corresponding shrouds 30 of each vane stage must be suitably sized for allowing assembly of the compressor components without interference therebetween, and providing sufficient axial clearance between the stationary stator vanes 28 and rotating rotor blades 22.

As shown in FIG. 2, each of the disks 20 includes an outer perimeter or platform 20a which defines an inner flowpath of the blades 22 in this exemplary embodiment, with the blades 22 extending radially outwardly therefrom. The disk platform 20a includes an upstream leading edge 20b. Correspondingly, the stator shroud 30 includes a platform 30a defining an inner flowpath of the vanes 28, with the shroud platform 30a having a downstream trailing edge 30b spaced axially from the leading edge 20b of the disk platform 20a to define an entrance 26a to the cavity 26. The opposite, upstream end of the vane platform 30a defines with the trailing edge of the upstream disk platform an outlet of the cavity 26.

Since it is desirable to minimize the size and weight of the vane shroud 30 itself, the unoccupied portion of the cavity 26 is correspondingly relatively large. The cavity 26 therefor provides a region in which a portion of the compressed air 34 could establish undesirable secondary flows and rotor windage pressure losses due to acceleration by the rotating disk 20 and spacer 24, and which could adversely affect compressor stall margin. However, these adverse conditions are ameliorated in accordance with the present invention by providing an annular cavity seal 36 which bridges the shroud 30 and the disk 20 below the platforms 30a and 20a thereof to seal and substantially reduce flow through the cavity entrance 26a. The cavity seal 36 limits the ability of the compressed air 34 to enter and circulate inside the cavity 26, which reduces the effective size of the cavity 26 for improving efficiency of the compressor 10 without requiring actual changes in the size of the cavity 26 or the spacing between the vanes 28 and the blades 22. In this way, space requirements in the cavity 26 for allowing unobstructed assembly of the stator 18 and rotor 16, and allowing unobstructed thermal expansion and contraction during operation is maintained.

The cavity seal 36 preferably abuts the vane shroud 30 and is attached thereto, and adjoins the rotor disk 20 for allowing unrestrained relative movement therebetween. Since the cavity seal 36 is an annular structure disposed coaxially with the engine centerline and having portions disposed in both casing halves 12a and 12b, it must be suitably assembled into the cavity 26 and retained stationary therein. Accordingly, means are provided in accordance with the present invention for fixedly retaining the cavity seal 36 to the vane shroud 30, with axial retention of the seal 36 in both casing halves 12a,b, and radially inward retention of the seal 36 in only the casing lower half 12b. This allows assembly and removal of the casing upper half 12a relative to the casing lower half 12b without radial interference or obstruction between the casing upper half shroud 30 and the seal 36 itself.

As indicated above, the vane shroud 30 may take any conventional form and be suitably modified in accordance with the present invention for supporting and retaining the cavity seal 36. Since the casing 12 is formed in two halves, the stator vanes 28 in each stage are separately mounted to each casing half. The vane shroud 30 is therefore formed in at least two sections, with a corresponding section attached to the vanes 28 in each casing half 12a,b. The vane shroud 30 may be formed of as many segments as desired in a conventional manner, but nevertheless is preinstalled with the vanes 28 in each casing half 12a,b.

In the exemplary embodiment illustrated in FIG. 2, the cavity seal retaining means is designated generally by the numeral 38 and is provided by suitably modifying a portion of the vane shroud 30 for positioning the cavity seal 36 at the relatively high-pressure entrance 26a of the cavity 26. Furthermore, the retaining means 38 must also be configured for allowing assembly and disassembly of the cavity seal 36 within the close quarters of the vane shroud 30 and the adjoining rotor disk 20.

The seal retaining means 38 includes an annular outer or aft flange 38a extending radially inwardly from the shroud 30 at the trailing edge 30b thereof, and an annular inner or forward flange 38b extending axially aft from the shroud 30 toward the disk 20. The inner flange 38b is spaced radially below the outer flange 38a to define therewith a generally C-section retainer recess 38c for trapping the cavity seal 36. Since the inner and outer flanges 38a,b are preferably integral portions of the vane shroud 30, they extend circumferentially and coaxially about the centerline axis of the compressor 10 and are circumferentially segmented along with the segmented vane shroud 30.

Figure 3:
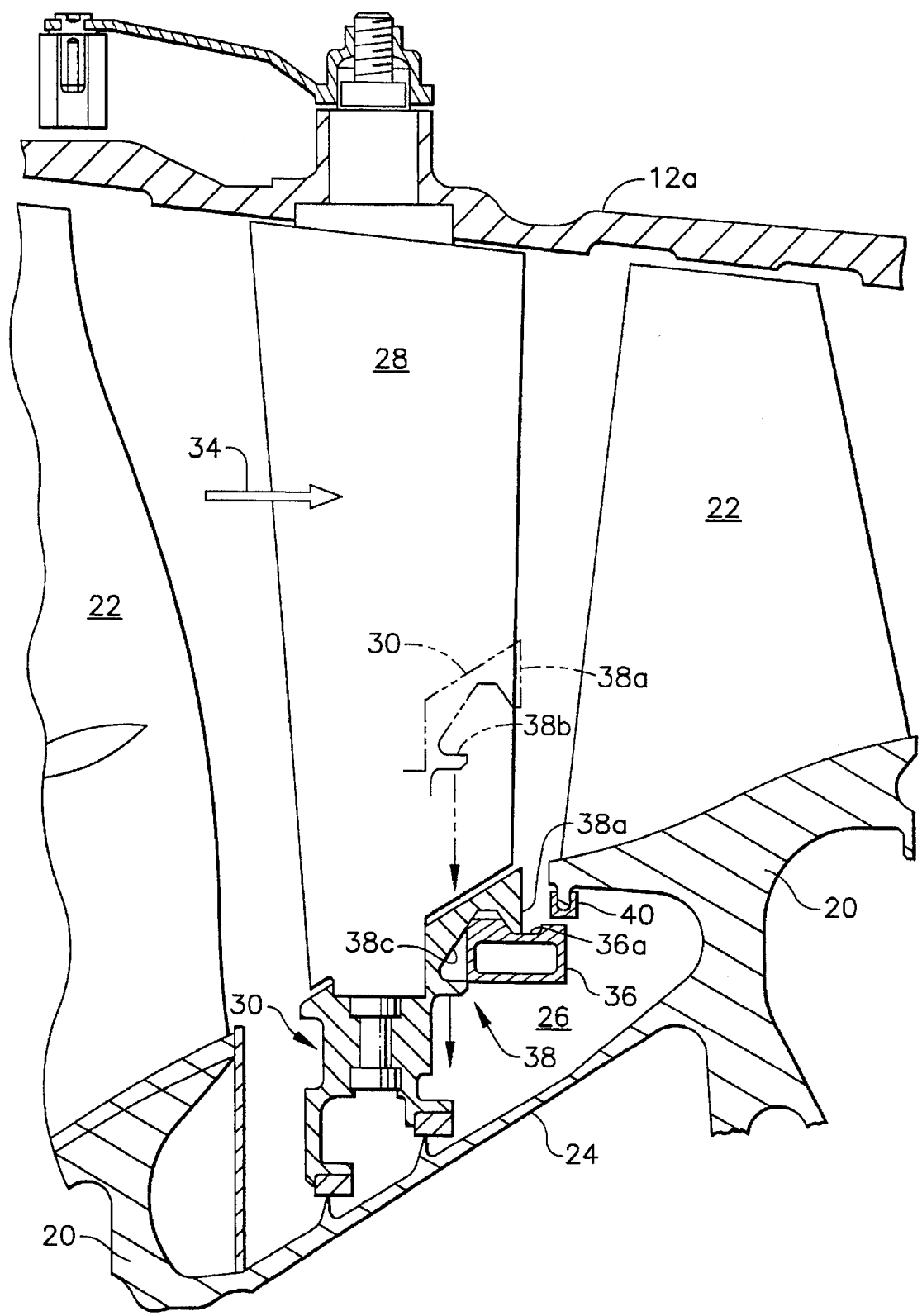
FIG. 3 is an axial elevational, partly sectional view of a portion of the casing upper half illustrated in FIG. 1 and taken along line 3—3 illustrating the upper portion of the cavity seal shown in FIG. 2 between the vane and blade rows.

The cavity seal 36 includes an annular, radially outwardly facing upper groove 36a which engages in abutting contact the upper flange 38a for axially retaining the seal 36 to the vane shroud 30, as well as radially outwardly retaining the seal 36 against radially outward movement. The seal 36 also includes an integral arcuate lower side flange 36b extending axially forwardly toward the shroud 30 in only the casing lower half 12b as illustrated in FIG. 2, and is not found in the casing upper half 12a as illustrated in FIG. 3. The side flange 36b engages in abutting contact the retainer inner flange 38b for radially inwardly retaining the seal 36 against inward radial movement. As shown in FIG. 2, the retainer recess 38c is preferably radially inclined, with an adjoining portion of the cavity seal 36 being correspondingly chamfered so that the cavity seal 36 is axially trapped by the outer flange 38a in the retainer recess 38c preventing axial forward or aft movement thereof. The cavity seal 36 is therefore axially retained around its entire perimeter in both casing halves 12a,b.

To allow assembly of the casing upper half 12a without obstruction of the retainer inner flange 38b with the seal 36, the seal side flange 36b is omitted in the casing upper half 12a as illustrated in FIG. 3. FIG. 3 also illustrates in part in phantom the radially inward movement of the vane shroud 30 of the casing upper half 12a into position radially downwardly past the installed cavity seal 36. The retainer inner flange 38b is suitably sized to radially clear the installed cavity seal 36 without interference in the casing upper half 12a. In the casing lower half 12b, however, as illustrated in FIG. 2, the retainer inner flange 38b overlaps the side flange 36b of the cavity seal 36 and thereby radially traps the cavity seal 36 into position.

As illustrated in FIG. 2, the cavity seal 36 is preferably hollow in most part for reducing weight and to maximize the torsional and bending moment stiffness to weight ratio, and is generally rectangular in axial cross section so that it axially bridges the cavity entrance 26a. The cavity seal 36 may cooperate with any suitable portion of the adjoining rotor disk 20 to provide an effective low-leakage seal at the cavity entrance 26a which effectively reduces cavity size. For example, the exemplary rotor disk 20 illustrated in FIG. 2 includes a radially inwardly extending annular leading edge flange 20c upon which is mounted a generally U-shaped annular damper 40. This damping configuration is conventional but provides a convenient appendage of the disk 20 adjacent to the cavity entrance 26a with which the cavity seal 36 may cooperate for sealing the cavity 26 as close as practical to its entrance 26a while allowing unobstructed rotation of the disk 20 relative to the stationary cavity seal 36.

The cavity seal as illustrated in FIG. 1 includes a plurality of circumferentially joined arcuate segments, with each segment being predeterminedly sized in arc length for being individually circumferentially inserted into the retainer recess 38c illustrated in FIG. 2 in the casing lower half 12b to collectively form a 360° ring in the absence of the casing upper half 12a prior to assembly thereof.

Figure 4:
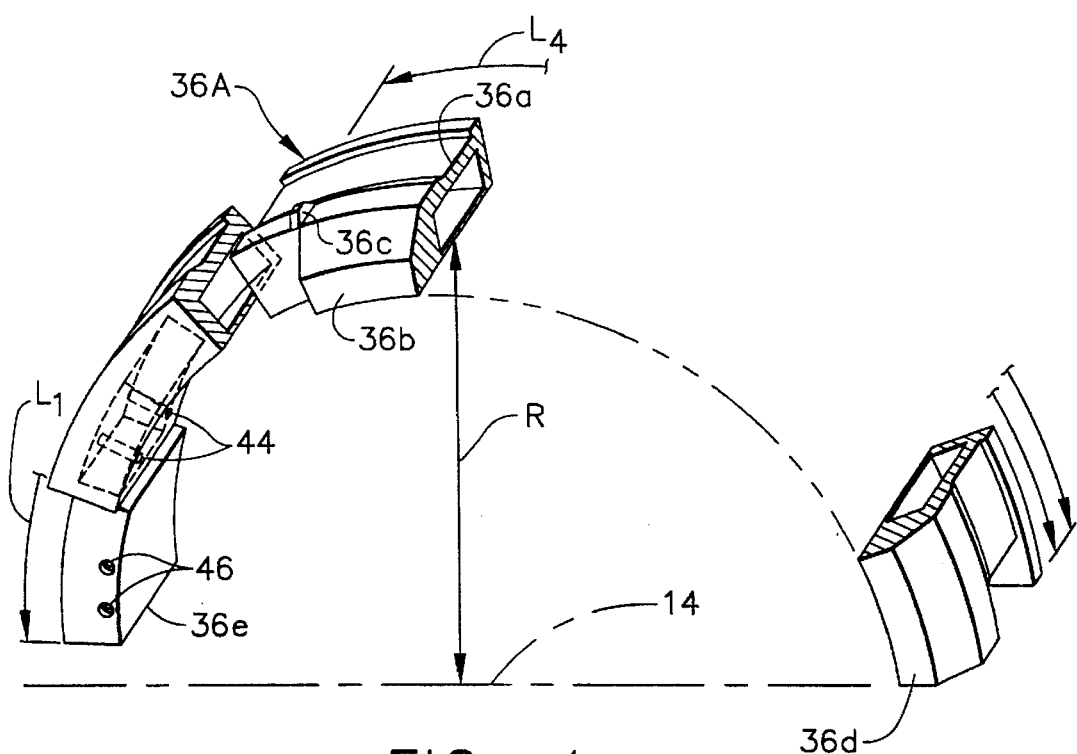
FIG. 4 is an enlarged, partly sectional view of a first arcuate segment of the multi-segment cavity seal illustrated in FIGS. 1–3 in accordance with an exemplary embodiment of the invention.
Figure 5:
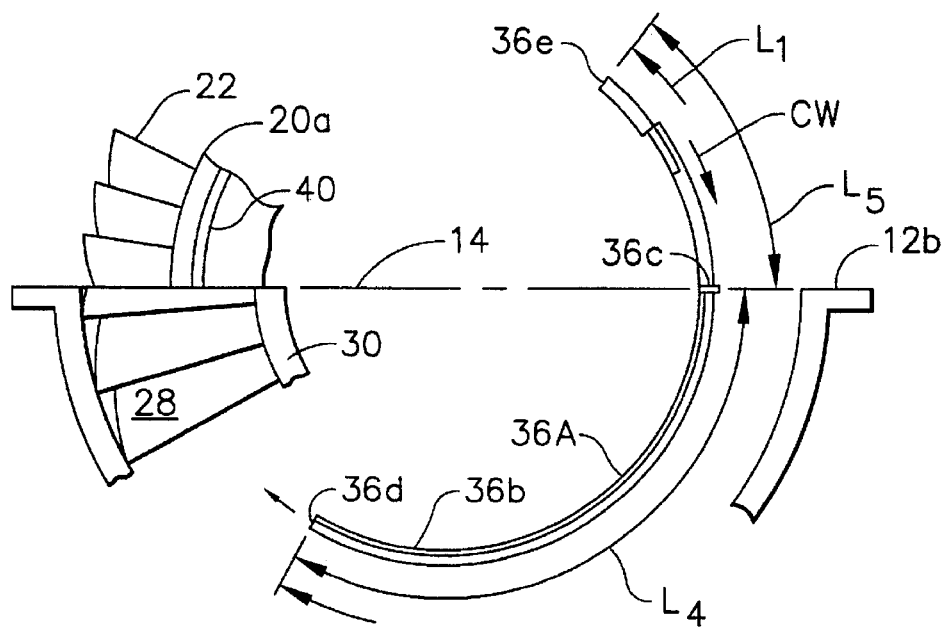
FIG. 5 is a schematic elevational front view of the compressor illustrated in FIG. 1 with the casing upper half removed to show installation of the first segment illustrated in FIG. 4 into the casing lower half.

A first cavity seal arcuate segment is designated 36A and is illustrated in isolation in FIG. 4. FIG. 5 illustrates schematically circumferential insertion of the first segment 36A in a clockwise (CW) rotation into its position within the retainer recess 38c in the casing lower half 12b. Since the cavity seal 36 may only be assembled after initial assembly of the rotor 16, vanes 28, and shroud 30 in the casing lower half 12b, each segment of the seal 36 which is contained in the casing lower half 12b must be suitably sized in arc length for being individually circumferentially inserted into its corresponding retainer recess 38c. Although two loosely fitted, or flexible, seal segments of about 180° arc length each could be used to complete the full ring, in the preferred embodiment three rigid seal segments are used for allowing unobstructed assembly of the segments into the retainer recess 38c without twisting or other deformation thereof, and for providing a consistently located seal for unobstructed upper casing half assembly.

As illustrated in FIG. 5, insertion of the first segment 36A into position in the casing 12b may be manually effected without obstruction except for friction resistance within the manufacturing tolerances between the first segment 36A and the retaining recess 38c. As the first segment 36A is inserted, the groove 36a illustrated in FIG. 2 frictionally engages the retainer outer flange 38a, and the seal side flange 36b frictionally engages the retainer inner flange 38b and recess 38c in sliding contact. In the preferred embodiment illustrated in FIG. 5, the first segment 36A is inserted only partly into the casing inner half 12b so that a portion thereof remains above the axial splitline 14 for ease of assembly and for reducing the total amount of insertion force required for overcoming friction during installation.

In order to specifically control the amount of first segment 36A inserted into the lower half 12b, the retainer outer flange 38a as illustrated in FIG. 2 includes a locating circumferential end 38d which is suitably recessed below the splitline 14. And, the first segment 36A as illustrated in FIGS. 2 and 4 includes a cooperating radially outwardly extending locating tab 36c disposed at a preselected intermediate position between opposite proximal and distal ends 36d and 36e of the segment 36A. The locating tab 36c as shown in FIG. 2 is disposed in abutting contact with the locating end 38d to limit and restrain circumferential movement of the cavity seal 36 in the retainer recess 38c. As shown in FIG. 5, the locating tab 36c prevents further insertion of the first segment 36A into the casing lower half 12b. The cavity seal side flange 36b therefore extends only from the segment proximal end 36d to the locating tab 36c, and is omitted from the remaining, upper portion of the first segment 36A.

Figure 6:
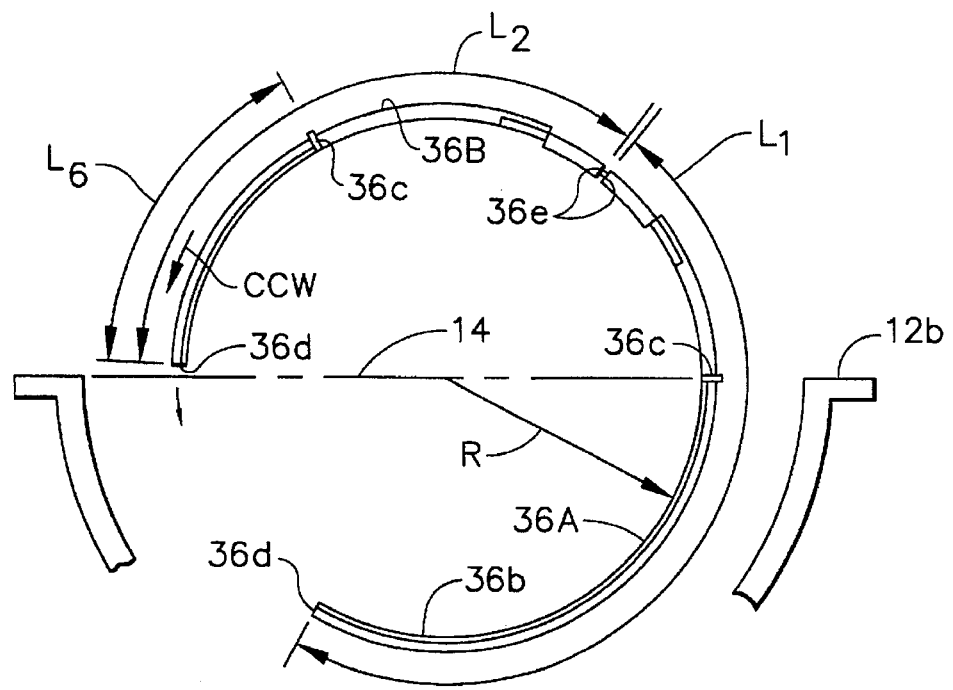
FIG. 6 is a schematic elevational, front view of the compressor illustrated in FIG. 1 with the casing upper half removed to show installation of a second arcuate segment of the cavity seal into the casing lower half.

As shown in FIG. 6, an arcuate second cavity seal segment designated 36B is generally identical to the first segment 36A illustrated in detail in FIG. 4, except that it is a mirror image thereof, and is preferably shorter in arc length, and has a differently configured proximal end 36d. As shown in FIG. 6, the first segment 36A has a first arc length $L_1$ and is preferably longer than the second segment 36B having a second arc length $L_2$. Both segments have the same inner radius R to the centerline axis of the compressor selected for positioning the segments into their respective portions of the retainer recess 38c. The second segment 36B is suitably smaller than the first segment 36A so that after the first segment 36A is installed in position in the casing inner half 12b the second segment 36B may be circumferentially inserted into position in the retainer recess 38c on the opposite side of the casing inner half 12b and manually inserted counterclockwise (CCW) into its final position, which is partially inserted into the casing lower half 12b as illustrated in FIG. 7.

Like the first segment 36A, the second segment 36B preferably also includes a respective locating tab 36c which engages a corresponding circumferentially end 38d of the retainer inner flange 38a recessed at the splitline in the same manner as illustrated in FIG. 2. As in the first segment 36A, the seal side flange 36b extends only from the proximal end 36d to the locating tab 36c of the second segment 36B, and does not extend along the upper portion of the second segment 36B above the locating tab 36c.

Figure 7:
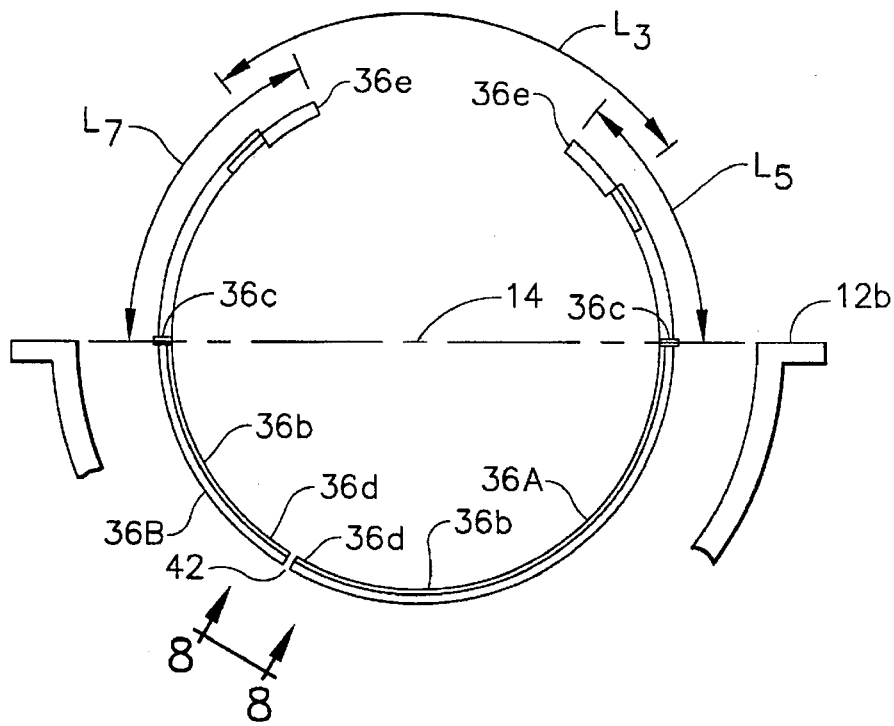
FIG. 7 is a schematic elevational, front view, like FIG. 6, showing final installation of both first and second segments into the casing lower half.

As shown in FIG. 7, the first and second segments 36A and 36B have adjoining proximal ends 36d when fully inserted into the casing lower half 12b. The adjoining proximal ends 36d are suitably configured in a tongue-and-groove joint 42 shown in more detail in FIG. 8 for allowing differential circumferential movement therebetween. In the exemplary embodiment illustrated in FIG. 8, the first segment 36A includes a radial end-groove, and the second segment 36B includes a complementary radial tongue. The corresponding locating tabs 36c are positioned to effect a suitably small circumferential gap in the joint 42 for accommodating thermal expansion of the components during operation, and for providing a continuous 360° seal at all temperatures. The joint 42 allows hoop expansion and contraction of the assembled cavity seal 36 while restraining differential axial movement between the first and second segments at the joint 42.

Figure 9:
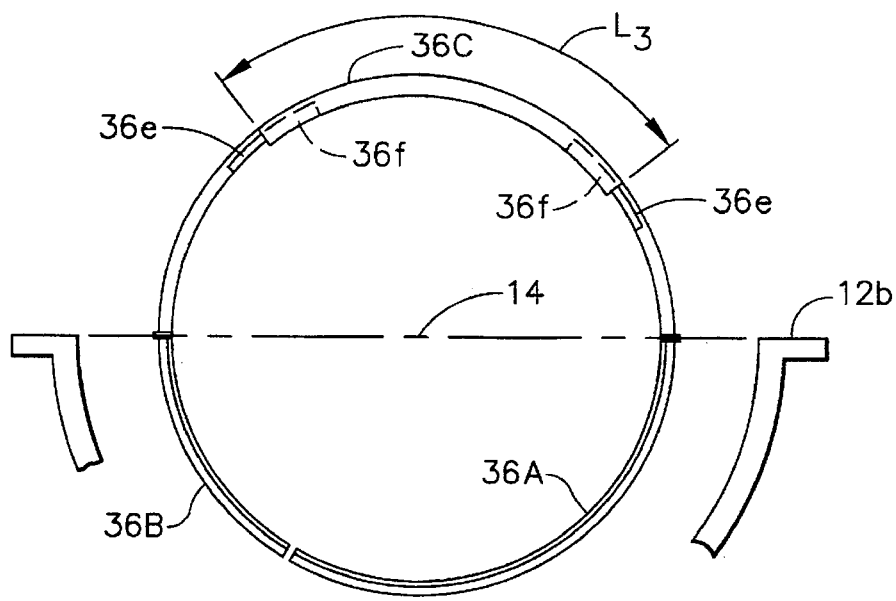
FIG. 9 is a schematic elevational, front view, like FIG. 7, illustrating assembly of a bridge segment with the installed first and second segments of the cavity seal to form a ring.

Referring again to FIG. 7, the assembled first and second segments 36A,B preferably have their respective distal ends 36e spaced circumferentially apart from each other. The seal 36 further includes a third or bridge segment 36C illustrated installed in FIG. 9 which joins together the first and second segments 36A,B to form a complete ring. As shown in FIG. 9, the second segment 36B is preferably longer than the bridge segment 36C, with the bridge segment 36C having a corresponding arc length $L_3$, to improve rigidity and strength to weight ratio.

Referring again to FIGS. 4 and 5, the locating tab 36c of the first segment 36A is positioned at a fourth arc length $L_4$ from the first segment proximal end 36d, with the remaining portion of the first segment 36A including its distal end 36e being contained within the casing upper half 12a (see FIG. 1), with the upper portion having a fifth arc length $L_5$. The second segment length $L_2$ is preferably slightly less than the remaining arc length between the first segment distal end 36e and the splitline 14, which is about equal to the supplementary angle of the fifth length $L_5$, for allowing assembly of the second segment 36B into the casing lower half 12b without obstruction or interference with the first segment 36A. Although the seal could be of U-channel or L-channel cross section, the box construction of the first and second segments 36A,B effects a relatively rigid, efficient, and light weight structure which is resistant to deformation or twisting. Since each of the segments 36A,B is being inserted circumferentially into the closely-sized retainer recess 38c, any misalignment thereof increases the difficulty of assembly thereof.

As shown in FIG. 6, the locating tab 36c of the second segment 36B is positioned from the proximal end 36d thereof at a sixth arc length $L_6$ which controls the final position of the second segments 36B in the casing lower half 12b upon assembly as illustrated in FIG. 7. The opposing distal ends 36e of the first and second segments 36A,B are circumferentially spaced apart from each other, and from the splitline 14 by the fifth arc length $L_5$ and a seventh arc length $L_7$, respectively. The bridge segment 36C illustrated in FIG. 9 has opposite bridge ends 36f which preferably circumferentially overlap the respective distal ends 36e of the first and second segments 36A,B to form a complete ring. The casing upper half 12a as illustrated in phantom in FIG. 3 may then be vertically lowered atop the casing lower half 12b so that the retainer outer flange 38a engages the perimeter groove 36a of the cavity seal 36, with sufficient axial clearance to allow the retainer inner flange 38b to radially clear the upper half of the cavity seal 36 to complete the assembly of the two casing halves.

In the preferred embodiment, the lengths $L_1$ and $L_2$ of the first and second seal segments 36A,B are about 172° and 130°, respectively. The positions $L_4$ and $L_6$ of the corresponding locating tabs 36c on the first and second segments are 123° and 58°, respectively. The first locating tab 36c not only preferably locates the respective upper and lower portions of the first segment 36A but also provides anti-rotation of the assembled seal 36 in the compressor 10. The second locating tab 36c is therefore redundant, but as indicated above provides preferred location of the second segment 36B during assembly. The second locating tab 36c maintains the initial, room temperature, gap in the end joint 42 shown in FIG. 8, as well as positions the distal ends 36e of the first and second segments 36A,B for receiving the bridge segment 36C as illustrated in FIGS. 7 and 9.

Figure 10:
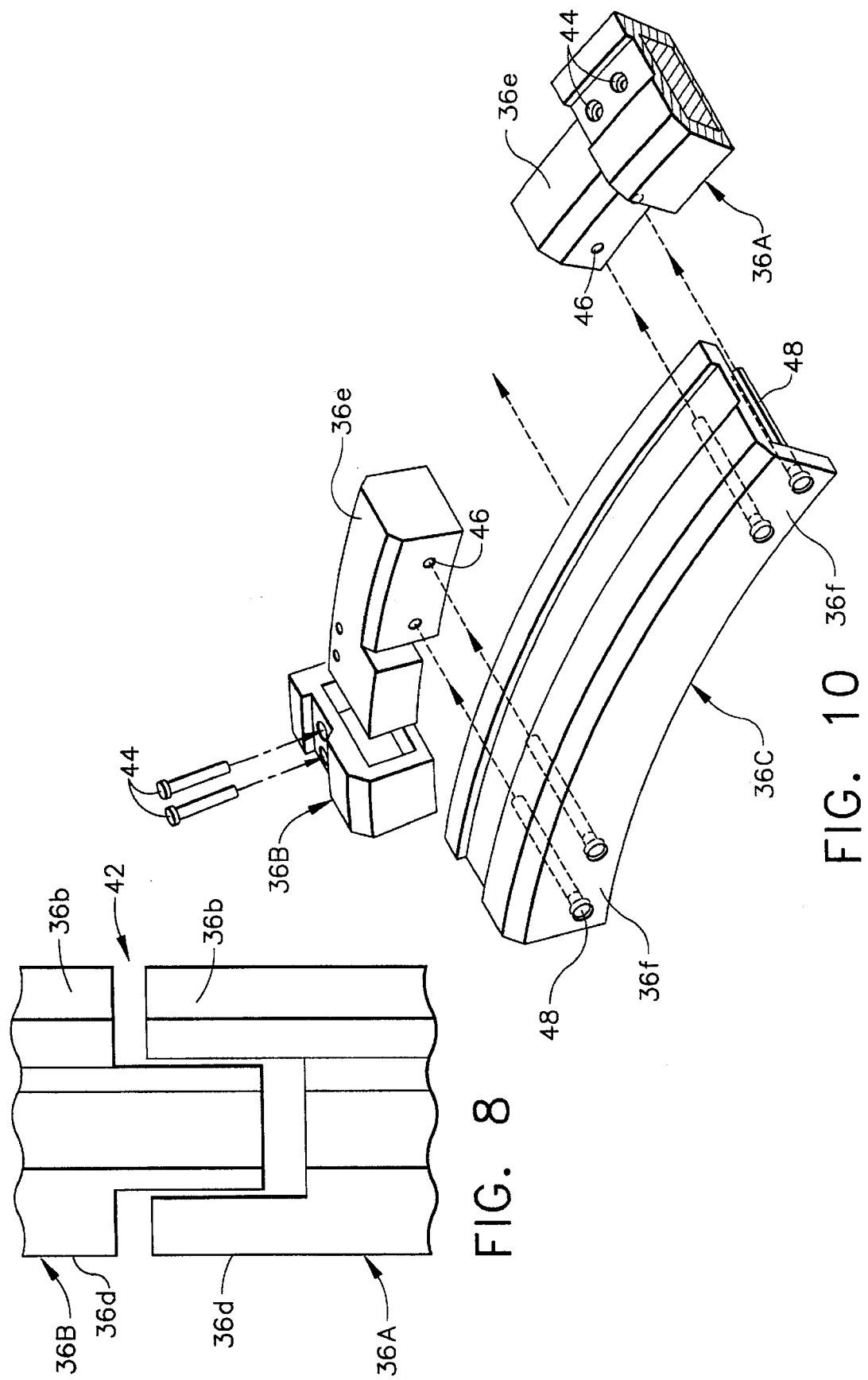
FIG. 10 is an exploded, isometric view of the bridge segment illustrated in FIG. 9 joined to distal ends of the cooperating first and second segments of the cavity seal.

More specifically, preferred embodiments of the bridge segment 36C and the adjoining first and second segments 36A and 36B are illustrated in more particularity in FIG. 10. As indicated above, the first and second segments 36A,B are preferably hollow for reducing weight, with the distal ends 36e thereof being in the form of separate adapters extending in part therein and fixedly joined thereto. Although the distal ends 36e could be integrally formed with the respective first and second segments 36A,B in corresponding one-piece components, the separate adapters provide a convenient transition in configuration for accepting a specially configured bridge segment 36C which sliding engages the adapters for simple retention therewith. In the preferred embodiment illustrated in FIG. 10, the adapters 36e are preferably solid and have complementary portions extending in part into the interior of the adjoining segments 36A,B. Radial holes are provided through both the segments 36A,B and the adapters 36e for receiving radial pins 44 for joining the adapters 36e to the respective segments. The outer holes in the segments are preferably larger than the heads of the pins 44 to allow the pins to recess below groove 36a and prevent interference with assembly of outer flange 38a, and so that the pins join together the adapters 36e with only the bottom portion of the hollow segments 36A,B. The pins 44 may be suitably welded, riveted, or bolted in position.

Figure 11:
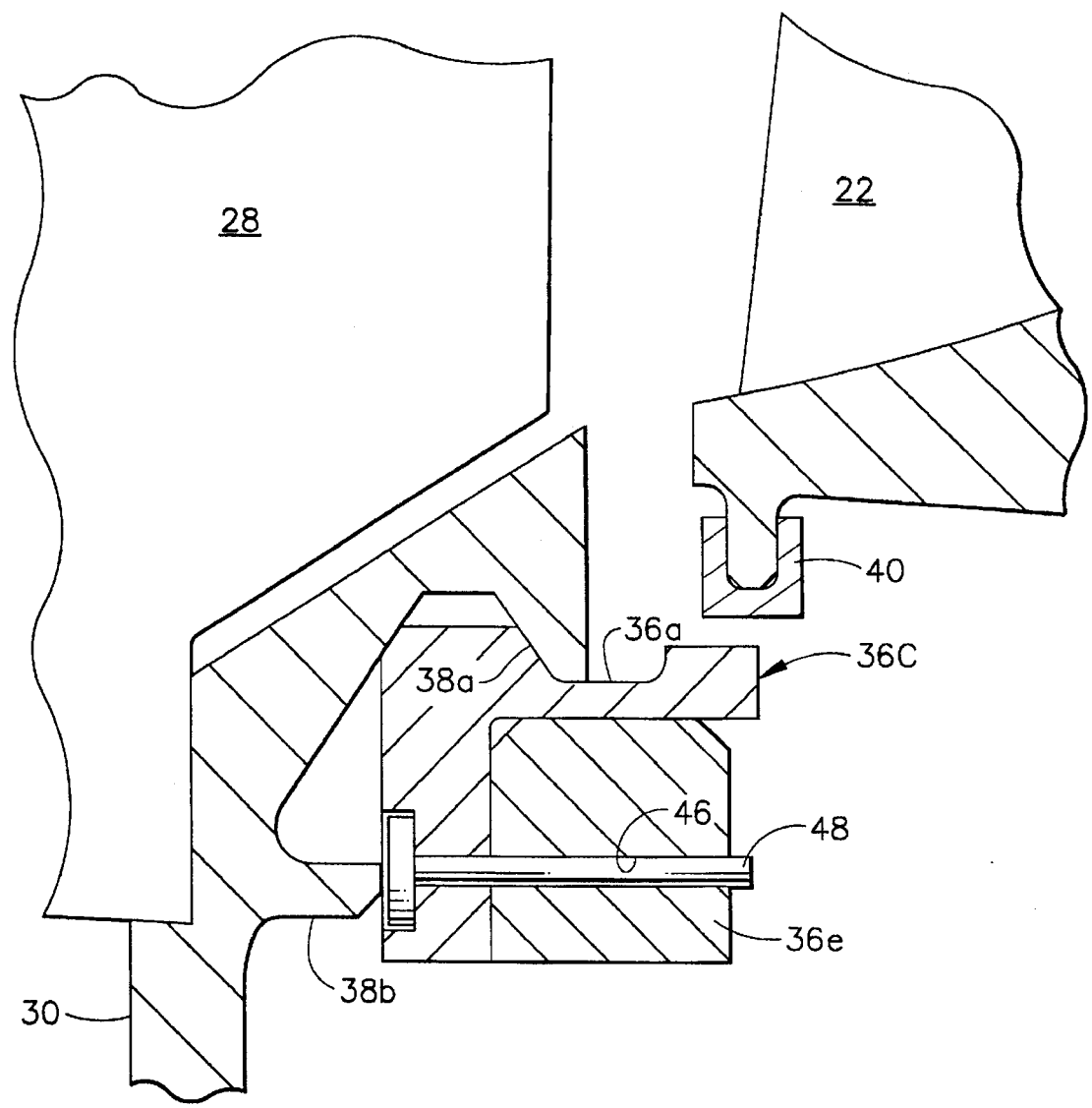
FIG. 11 is an elevational, partly sectional axial view through the joined bridge and first segments of the cavity seal illustrated in FIG. 1 and taken along line 11—11.

As shown in FIGS. 10 and 11, the bridge segment 36C is preferably L-shaped in axial section and is suitably removably fixedly joined to the adapters 36e. The radially outer leg of the bridge segment 36C illustrated in FIG. 11 is substantially identical in configuration with the perimeter of the first and second segments 36A,B, including the perimeter groove 36a for engaging the retainer outer flange 38a. The axially forward, side leg of the bridge segment 36C is substantially identical in configuration and extends circumferentially coextensively with the adjoining surfaces of the first and second segments 36A,B.

As shown in FIG. 10, the distal ends, or adapters 36e, of the first and second segments each preferably includes two axial through-bores 46. And, the bridge ends 36f include a corresponding number of axial pins 48 fixedly joined thereto. As shown in FIG. 11, the pins 48 have heads which are recessed in suitable counterbores in the bridge segment 36C and may be simply press fit in an interference fit in the bridge segment 36C. The several axial pins 48 are aligned with respective ones of the axial bores 46 so that they may be axially inserted therein, as illustrated in FIG. 10, to extend inside respective ones of the bores 46 for circumferentially and radially joining together the bridge segment 36C with the first and second segments 36A,B.

At the point in the assembly process illustrated in FIG. 7, the first and second segments are ready to receive the bridge segment 36C without obstruction from the casing upper half 12a. The bridge segment 36C illustrated in FIG. 10 may be manually aligned with the respective ends of the first and second segments so that the respective axial pins 48 can frictionally engage the axial bores 46 as they slide together. The casing upper half illustrated in FIG. 11 may then be lowered vertically so that the retainer outer flange 38a engages the perimeter recess 36a, with the retainer inner flange 38b being aligned at the same radial position with the heads of the axial pins 48. In this way, the retainer outer flange 38a axially retains the cavity seal 36, with the retainer inner flange 38b also providing a redundant method of preventing axial escape of the pins 48 during operation. Comparing FIGS. 3 and 11, it is noted that the bridge segment 36C may extend suitably radially inwardly more than the first and second segments 36A,B for increased rigidity, and to position the axial pins 48 in alignment with the retainer inner flange 38b.

Although preferred embodiments of the multi-segment cavity seal 36 and retaining means 38 have been described above, it will be apparent to those skilled in the art that these components may be modified in configuration as desired for various other applications. This design provides an effective 360° seal between the shrouds of the stator vanes and the rotor disk for effectively closing the interstage cavity. The design does not affect the conventional axial clearances in the compressor and requires no modification or special sealing features to be incorporated into the rotor 16 itself. The cavity seal is retained by suitable modifications of the common vane shroud configuration in a relatively simple arrangement which allows assembly of the seal itself without obstruction, as well as assembly of the casing upper half without obstruction by the seal.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A compressor comprising:
    an axially split casing including arcuate lower and upper halves joined together at respective axial flanges to collectively form an annular casing having an axial splitline;
    a rotor including a disk having a row of rotor blades extending radially outwardly therefrom inside said casing, and an annular spacer extending axially from said disk radially inwardly from said blades to define a cavity;
    a stator disposed coaxially with said rotor and including a row of stator vanes extending radially inwardly from said casing adjacent to said blade row, and a circumferentially extending shroud fixedly joined to radially inner ends of said vanes and disposed in said cavity;
    an annular cavity seal abutting said vane shroud and adjoining said rotor disk; and means for retaining said seal to said shroud with axial retention of said seal in both said casing halves, and radially inward retention of said seal in only said casing lower half for allowing assembly and removal of said casing upper half relative to said casing lower half without radial interference between said casing upper half shroud and said seal.

2. A compressor according to claim 1 wherein:
    said disk includes a platform defining an inner flowpath of said blades, with said disk platform having a leading edge;
    said vane shroud includes a platform defining an inner flowpath of said vanes, with said shroud platform having a trailing edge spaced axially from said disk platform to define an entrance to said cavity; and
    said cavity seal bridges said shroud and disk below said platforms thereof to seal said cavity entrance.

3. A compressor according to claim 2 wherein:
    said seal retaining means comprise:
        an annular outer flange extending radially inwardly from said shroud at said trailing edge thereof;
        an annular inner flange extending axially aft from said shroud toward said disk, and spaced radially below said outer flange to define therewith a generally C-section retainer recess; and
    said cavity seal comprises:
        an annular, radially outwardly facing outer groove engaging said outer flange for axially retaining said seal; and
        an arcuate side flange extending axially forwardly toward said shroud in said casing lower half, and engaging said retainer inner flange for radially retaining said seal.

4. A compressor according to claim 3 wherein said cavity seal includes a plurality of circumferentially joined arcuate segments sized in arc length for being individually circumferentially inserted into said retainer recess in said casing lower half.

5. A compressor according to claim 4 wherein:
    said cavity seal includes a bridge segment joining together first and second segments to collectively form a ring; and said first segment is longer than said second segment, and said second segment is longer than said bridge segment.

6. A compressor according to claim 5 wherein:

said first and second segments have adjoining proximal ends defining a tongue-and-groove joint for allowing differential radial and circumferential movement therebetween, and opposite distal ends spaced circumferentially apart from each other; and said bridge segment has opposite bridge ends fixedly joined to respective ones of said first and second segment distal ends.

7. A compressor according to claim 6 wherein:

said first and second segment distal ends include a plurality of axial bores; and said bridge ends include a plurality of axial pins fixedly joined thereto;

with said pins extending inside said bores for circumferentially and radially joining together said bridge segment with said first and second segments.

8. A compressor according to claim 6 wherein:

said retainer outer flange includes a locating circumferential end at said casing splitline; and said first segment includes a radially extending locating tab disposed at an intermediate position between said proximal and distal ends thereof;

with said locating tab being disposed in abutting contact with said locating end to restrain circumferential movement of said cavity seal in said retainer recess.

9. A compressor according to claim 8 wherein:

said locating tab is joined to said first segment so that said first segment proximal end is contained within said casing lower half, and said first segment distal end is contained within said casing upper half; and said second segment length is less than the arc length between said first segment distal end and said splitline for allowing assembly of said second segment into said casing lower half without obstruction with said first segment.

10. A compressor according to claim 6 wherein:

said first and second segments are hollow, and said distal ends thereof are in the form of separate adapters extending in part therein and fixedly joined thereto; and said bridge segment is L-shaped in section and is fixedly joined to said adapters.

* * * * *